E. E. GOLD.
CONTROLLER FOR HEATING SYSTEMS.
APPLICATION FILED SEPT. 3, 1919.
1,373,417.
Patented Apr. 5, 1921.
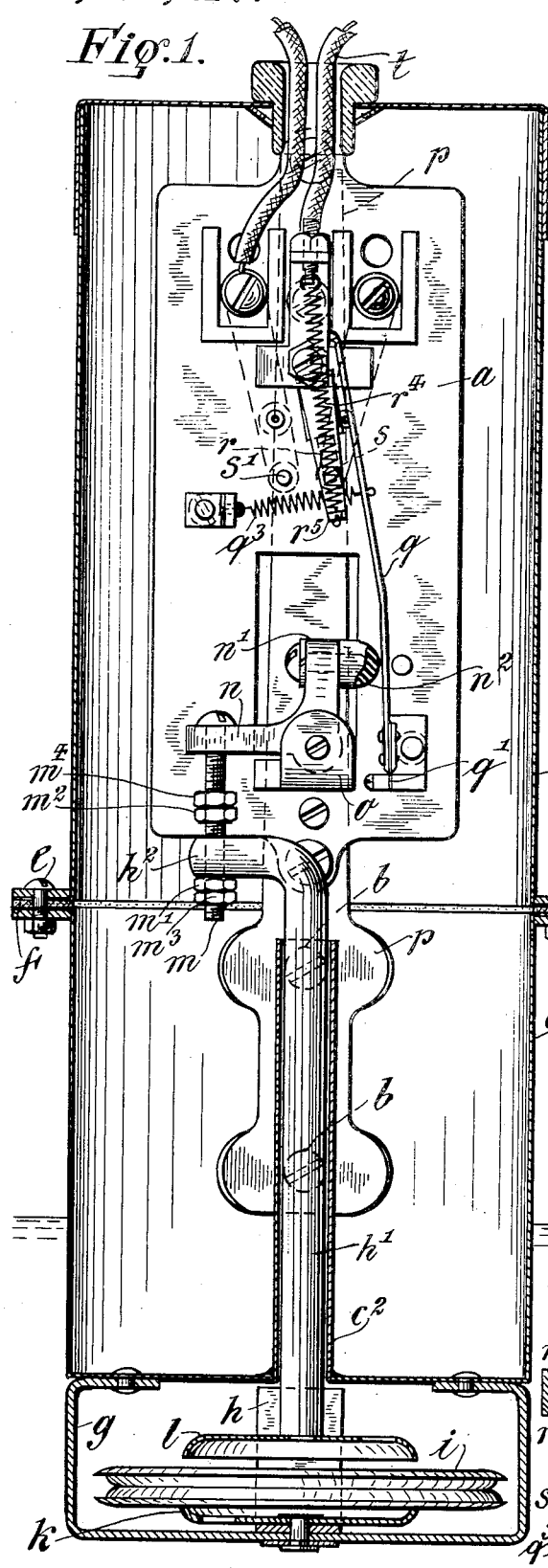
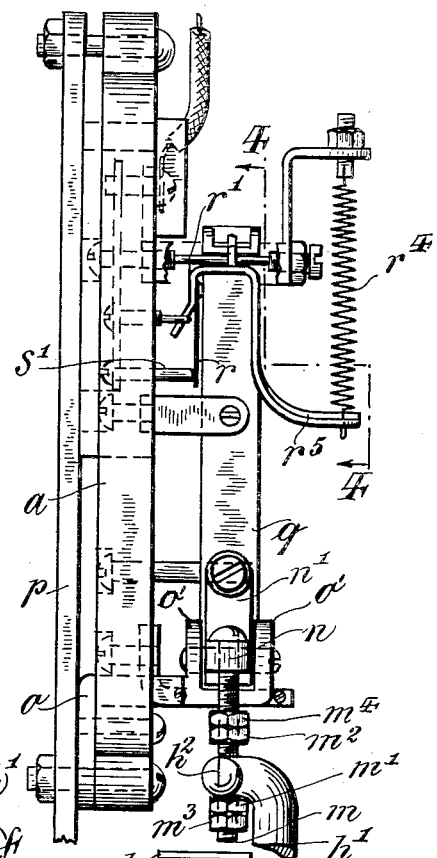
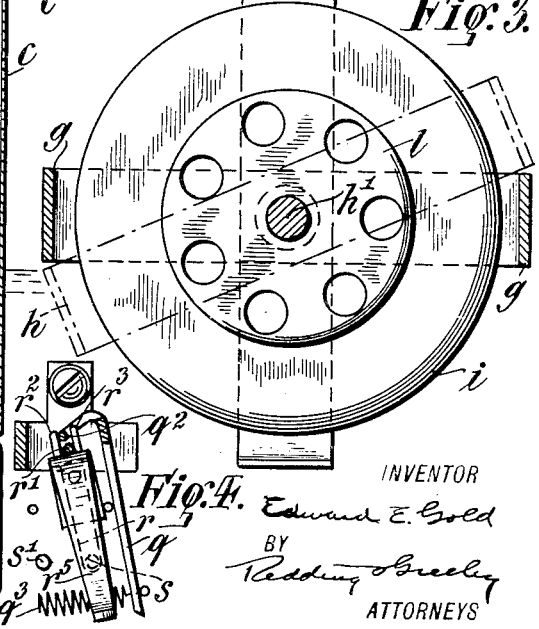
INVENTOR
Edward E. Gold
BY
Redding Greeley
ATTORNEYS

ёЁ

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

CONTROLLER FOR HEATING SYSTEMS.

1,373,417.      Specification of Letters Patent.      Patented Apr. 5, 1921.

Application filed September 3, 1919. Serial No. 321,310.

*To whom it may concern:*

Be it known that I, EDWARD E. GOLD, a citizen of the United States, residing in the borough of Manhattan of the city of New York, in the State of New York, have invented certain new and useful Improvements in Controllers for Heating Systems, of which the following is a specification, reference being had to the accompanying drawings, forming a part hereof.

This invention relates to a controller for heating systems and is concerned particularly with a device operable thermostatically for regulating the temperature of a body of liquid in a tank. In accordance with the invention there is provided within a closed vessel a switch member which is operatively connected to a thermostat exposed to the liquid whose temperature is to be controlled, this switch member being movable under the influence of the thermostat to control an electric circuit in which may be included any suitable devices for regulating the supply of a heating medium. The invention has for one of its objects to provide an improved support for the thermostatic vessel so as to maintain the said vessel in proper relation to its connections with the switch and yet permit its ready removal for inspection and replacement. A further object is to mount a switch member and its associated parts on an improved plate or standard which may be secured within the protecting casing therefor. Still another object is to provide within the protecting casing or vessel for the electrical devices a central overflow tube within which is guided an actuating stem for the switch member, the tube serving to prevent the entry of liquid into the protecting vessel. The invention has certain other objects concerned with the improvement of details of construction as will be pointed out in the description of the preferred embodiment of the invention shown in the drawing, in which—

Figure 1 is a view in section through the vessel for the electrical devices, the devices themselves being shown in elevation.

Fig. 2 is a fragmentary view in side elevation of the electrical devices and connections therefor.

Fig. 3 is a detail view in horizontal section taken through the supporting cage for the thermostat.

Fig. 4 is a detail view of the switch member taken on the plane indicated by the broken lines 4—4 of Fig. 2 and looking in the direction of the arrows parts being broken away in the interest of clearness.

The base $a$ on which are supported the actuating elements for the electrical control devices is shown as carried by the back plate $p$, the latter being secured by means of screws $b$ to the inner wall of the lower section $c$ of the protecting vessel, the upper section $d$ thereof being secured to the lower section by means of bolts $e$, the two sections having abutting flanges $d'$, $c'$, between which is interposed a packing ring $f$. To the bottom of the lower section $c$ is riveted a diametrically extending piece of strap metal $g$ on which the entire vessel may rest. Rotatively secured to the strap $g$ is a second U-shaped piece of strap metal $h$ movable from a position at right angles to the piece $g$ to a position such as is indicated in dotted lines in Fig. 3. Within the cage formed by the metal pieces $g$, $h$, may be confined a thermostatic vessel $i$, the removal of this vessel being readily accomplished by rotating the strap $h$ to the position indicated in dotted lines in Fig. 3. The thermostat $i$, when in position, rests on a plate $k$ which is supported on the base $g$ and the upper side of the thermostat, upon expansion, is adapted to engage a plate $l$ fixed on the lower end of a rod $h'$ which rests within a tubular extension $c^2$ of the bottom of the lower section $c$ of the containing vessel. This tubular extension $c^2$ serves as a guide for the rod $h'$ and also prevents the entry of the liquid into the containing vessel. The upper end of the rod $h'$ is bent at right angles, as at $h^2$, and has extending through the bent portion a screw $m$ upon which are threaded nuts $m'$, $m^2$, the distance between which will determine the effective range of movement of the rod $h'$ before actuation of the electrical control devices hereinafter to be described. The nut $m'$ may be locked in place by a second nut $m^3$ and the nut $m^2$ may be similarly locked in place by a lock nut $m^4$. The screw is supported in a bell crank lever $n$ which is journaled in the arms $o'$ of a bracket $o$ secured to the back plate $p$ on which the base $a$ is carried. On one of the arms $n'$ of the bell crank lever $n$ is carried an insulated button $n^2$ which is disposed in operative relation to a swinging arm $q$ supported by a leaf spring $q'$ on the base $a$ and having its upper end in engagement with a swinging switch member $r$ supported on a rock shaft $r'$. The end of the arm $q$ is reversely bent, as at $q^2$, and its extreme end rests between two pins $r^2$, $r^3$ in the end of the switch member $r$. A spring $q^3$ normally draws the arm $q$ toward the left, as shown in Fig. 1, so as to cause its end $q^2$ to press against the pin $r^2$ and to hold the switch $r$ in the position shown in Fig. 1 where it makes contact with a terminal member $s$. The switch member $r$ is held in this position by the further action of a spring $r^4$ which engages an arm $r^5$ of the switch member in such position as to swing the arm normally beyond the axis of rotation of the switch member on the shaft $r'$. When the arm $q$ is moved to the right under thermostatic control as will be pointed out later, the end $q^2$ engages the pin $r^3$ and throws the switch member to the left, as viewed in Fig. 1, until it engages a second terminal member $s'$. This movement is caused against the action of the spring $q^3$ and, initially, against the action of the spring $r^4$. When the arm $r^5$ of the switch $r$ passes beyond the dead center point the spring $r^4$ tends to assist the final movement to bring the switch member $r$ into contact with the terminal $s'$.

The switch $r$ may be connected in the controlling circuit through a lead $t$. The terminals $s$ and $s'$ may be connected separately to the other sides of the electrical circuit, so that, for instance, when the circuit is closed through the contact point $s$, the electrical control devices (not illustrated) permit the flow of the heating medium to the liquid to be heated and when the switch $r$ is moved to bring the terminal $s'$ in circuit, such electrical control devices are actuated to cut off such heating medium.

In using the improved thermostat with the parts assembled, the closed vessel is placed in the liquid whose temperature is to be controlled, resting on the base $g$. The thermostat $i$ being responsive to the temperature of the liquid in which it rests will expand and engage the plate $l$ on the operating rod $h'$. When the temperature of the liquid reaches a predetermined maximum continued expansion of the vessel $i$ will move the rod $h'$ until its arm $h^2$ engages the check nut $m^2$ and rocks the bell crank $n$. The button $n^2$ engages the face of the arm $q$ and, under the influence of the thermostat, will swing the arm $q$ against the action of the spring $q^3$ and cause the switch member $r$ to break from the contact $s$ and close the circuit through the contact $s'$. The relation of the springs $q^3$ and $r^4$ is such that the movement of the switch is accomplished with a snap, as is desirable, so as to prevent arcing.

The central overflow and guide tube $c^2$ prevents the entry of liquid into the closed container. The character of the sectional container is such that by removing the upper section $d$ all of the working parts of the electrical devices are readily exposed to view. Since the supporting post $p$ for the base plate $a$ is secured to the lower section $c$ the removal of the upper section $d$ may be effected without disturbing any of the elements. The devices are simple, compact and readily accessible. The support for the thermostat is such as to permit its ready removal and replacement and insure its proper positioning when inclosed by the cage formed by the base.

It is recognized that the apparatus, considered broadly, is not new and, accordingly, the appended claims are drawn to cover only those details of construction which are considered of novelty and utility.

I claim as my invention:

1. In a controller for heating systems, in combination with electrical control devices, a support for said devices, a thermostatic expansible vessel to actuate said control devices, operative connections between said vessel and the control devices, and means to support said vessel removably in operative relation to said connections, said means comprising a U-shaped strap secured to the support for said electrical control devices and a second U-shaped strap rotatably mounted in the first named U-shaped strap.

2. In a controller for heating systems, in combination with electrical control devices, a tank in which said devices are supported, a base for the tank comprising a U-shaped strap secured to the bottom thereof, a thermostatic expansible vessel to actuate said control devices supported on said strap, operative connections extending from said vessel to said control devices, and a second U-shaped strap removably mounted on the first named U-shaped strap to hold the vessel removably in operative relation to said connections.

3. A thermostatic control for liquids, comprising electrical control devices, a sectional tank in which said devices are supported, a thermostatic expansible vessel supported without the tank and exposed to the liquid, operative connections between the expansible vessel and the control devices including a rod extending through the bottom wall of the tank, and an overflow guide tube formed in the lower section of the tank and through which said rod extends.

4. In a controller for heating systems, a tank, a thermostatic expansible vessel supported without the tank beneath the bottom thereof, a controlling switch member supported within the tank, a rod operatively disposed with relation to the expansible vessel and extending into the tank, a spring-pressed movable arm engaging the switch member, a bell crank having one arm operatively disposed with relation to the first named arm, a stud carried by the other arm of the bell crank, an arm on the inner end of the rod through which the stud extends, and adjustable stops on the stud to be engaged by the arm on the rod and determine the effective range of movement of the expansible vessel.

5. A thermostatic control for liquids comprising a sectional tank, a base secured to the bottom thereof, an expansible vessel supported in the base and exposed to the liquid, a bracket secured to the inner wall of the lower section of the tank, a plate carried on the bracket, electrical control devices supported on the plate, operative connections between said control devices and the expansible vessel, said connections being supported by the bracket and plate, and means to secure the upper section of the tank detachably to the lower section.

This specification signed this 29th day of August A. D. 1919.

EDWARD L. GOLD.